United States Patent
Dai et al.

(10) Patent No.: US 12,557,043 B2
(45) Date of Patent: Feb. 17, 2026

(54) ASSISTED RESOURCE RESERVATION FOR SIDELINK COMMUNICATION WITH LOW TRANSMIT POWER

(71) Applicant: QUALCOMM Incorporated, San Diego, CA (US)

(72) Inventors: Jing Dai, Beijing (CN); Chao Wei, Beijing (CN); Peng Cheng, Beijing (CN); Min Huang, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 18/256,016

(22) PCT Filed: Feb. 9, 2021

(86) PCT No.: PCT/CN2021/076169
§ 371 (c)(1),
(2) Date: Jun. 5, 2023

(87) PCT Pub. No.: WO2022/170455
PCT Pub. Date: Aug. 18, 2022

(65) Prior Publication Data
US 2024/0064659 A1    Feb. 22, 2024

(51) Int. Cl.
*H04W 52/38* (2009.01)
*H04W 72/40* (2023.01)

(52) U.S. Cl.
CPC ......... *H04W 52/383* (2013.01); *H04W 72/40* (2023.01)

(58) Field of Classification Search
CPC ... H04W 52/383; H04W 72/02; H04W 72/20; H04W 72/40; H04W 74/002; H04W 74/0808; Y02D 30/70
See application file for complete search history.

(56) References Cited

U.S. PATENT DOCUMENTS

2020/0029340 A1* 1/2020 He ................... H04W 72/044
2021/0153167 A1* 5/2021 Sarkis ............... H04W 72/0446
(Continued)

FOREIGN PATENT DOCUMENTS

CN    109565793 A    4/2019
CN    110266449 A    9/2019
(Continued)

OTHER PUBLICATIONS

Intel Corporation: "Summary for AI 7.2.4.2.2 Mode-2 Resource Allocation," 3GPP TSG RAN WG1 Meeting #97, R1-1907699, Reno, USA, May 13-17, 2019, May 17, 2019 (May 17, 2019), the whole document, 26 pages.
(Continued)

*Primary Examiner* — Kashif Siddiqui
(74) *Attorney, Agent, or Firm* — Harrity & Harrity, LLP

(57) ABSTRACT

Various aspects of the present disclosure generally relate to wireless communication. In some aspects, an assisting user equipment (UE) may determine, within a resource selection window, one or more resources to reserve in a shared resource pool for an internal sidelink transmission within a disaggregated UE group including the assisting UE and one or more assisted UEs. The assisting UE may transmit, over a sidelink, an assisting reservation message indicating a lower reference signal received power (RSRP) to project onto the one or more resources reserved for the internal sidelink transmission relative to a measured RSRP that is based at least in part on a transmit power associated with the assisting reservation message. Numerous other aspects are described.

30 Claims, 11 Drawing Sheets

(56) References Cited

U.S. PATENT DOCUMENTS

2021/0345145 A1* 11/2021 Sarkis .................. H04L 5/16
2022/0046603 A1*  2/2022 Hosseini ............... H04W 4/40
2023/0111530 A1*  4/2023 Liu .................. H04W 74/0808
                                                        370/252

FOREIGN PATENT DOCUMENTS

WO      2020017939 A1    1/2020
WO   WO-2020186381 A1 *  9/2020  ............ H04W 72/56

OTHER PUBLICATIONS

International Search Report and Written Opinion—PCT/CN2021/076169—ISA/EPO—Oct. 28, 2021.

* cited by examiner

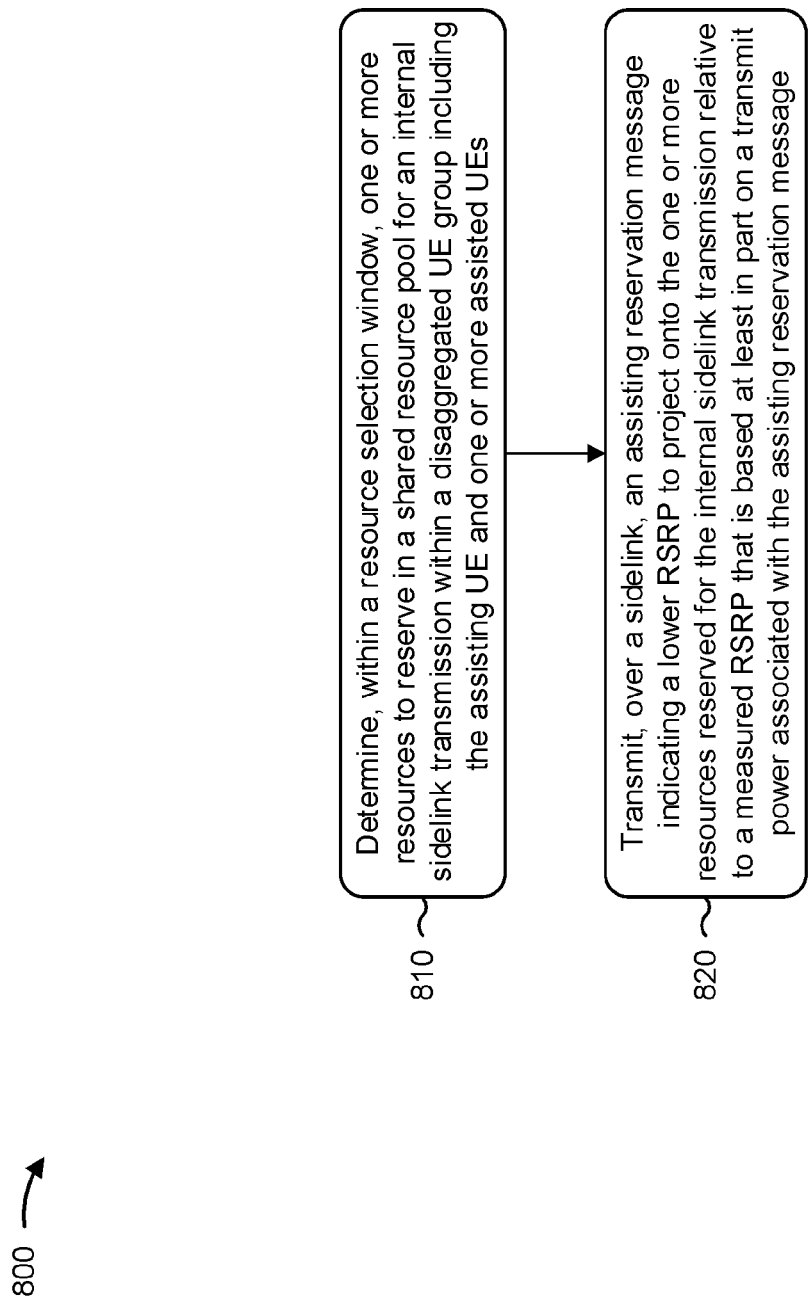

ASSISTED RESOURCE RESERVATION FOR SIDELINK COMMUNICATION WITH LOW TRANSMIT POWER

CROSS-REFERENCE TO RELATED APPLICATION

This application is a 371 national stage of Patent Cooperation Treaty (PCT) Application No. PCT/CN2021/076169 filed on Feb. 9, 2021, entitled "ASSISTED RESOURCE RESERVATION FOR SIDELINK COMMUNICATION WITH LOW TRANSMIT POWER," which is hereby expressly incorporated by reference herein.

FIELD OF THE DISCLOSURE

Aspects of the present disclosure generally relate to wireless communication and to techniques and apparatuses for assisted resource reservation for sidelink communication with low transmit power.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3 GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an apparatus for wireless communication at an assisting user equipment (UE) includes a memory and one or more processors coupled to the memory, the memory and the one or more processors configured to: determine, within a resource selection window, one or more resources to reserve in a shared resource pool for an internal sidelink transmission within a disaggregated UE group including the assisting UE and one or more assisted UEs; and transmit, over a sidelink, an assisting reservation message indicating a lower reference signal received power (RSRP) to project onto the one or more resources reserved for the internal sidelink transmission relative to a measured RSRP that is based at least in part on a transmit power associated with the assisting reservation message.

In some aspects, a method of wireless communication performed by an assisting UE includes determining, within a resource selection window, one or more resources to reserve in a shared resource pool for an internal sidelink transmission within a disaggregated UE group including the assisting UE and one or more assisted UEs; and transmitting, over a sidelink, an assisting reservation message indicating a lower RSRP to project onto the one or more resources reserved for the internal sidelink transmission relative to a measured RSRP that is based at least in part on a transmit power associated with the assisting reservation message.

In some aspects, an apparatus for wireless communication includes means for determining, within a resource selection window, one or more resources to reserve in a shared resource pool for an internal sidelink transmission within a disaggregated UE group including the apparatus and one or more assisted UEs; and means for transmitting, over a sidelink, an assisting reservation message indicating a lower RSRP to project onto the one or more resources reserved for the internal sidelink transmission relative to a measured RSRP that is based at least in part on a transmit power associated with the assisting reservation message.

In some aspects, a non-transitory computer-readable medium storing a set of instructions for wireless communication includes one or more instructions that, when executed by one or more processors of an assisting UE, cause the UE to: determine, within a resource selection window, one or more resources to reserve in a shared resource pool for an internal sidelink transmission within a disaggregated UE group including the assisting UE and one or more assisted UEs; and transmit, over a sidelink, an assisting reservation message indicating a lower RSRP to project onto the one or more resources reserved for the internal sidelink transmission relative to a measured RSRP that is based at least in part on a transmit power associated with the assisting reservation message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process associated with assisted resource reservation for sidelink communication with low transmit power, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
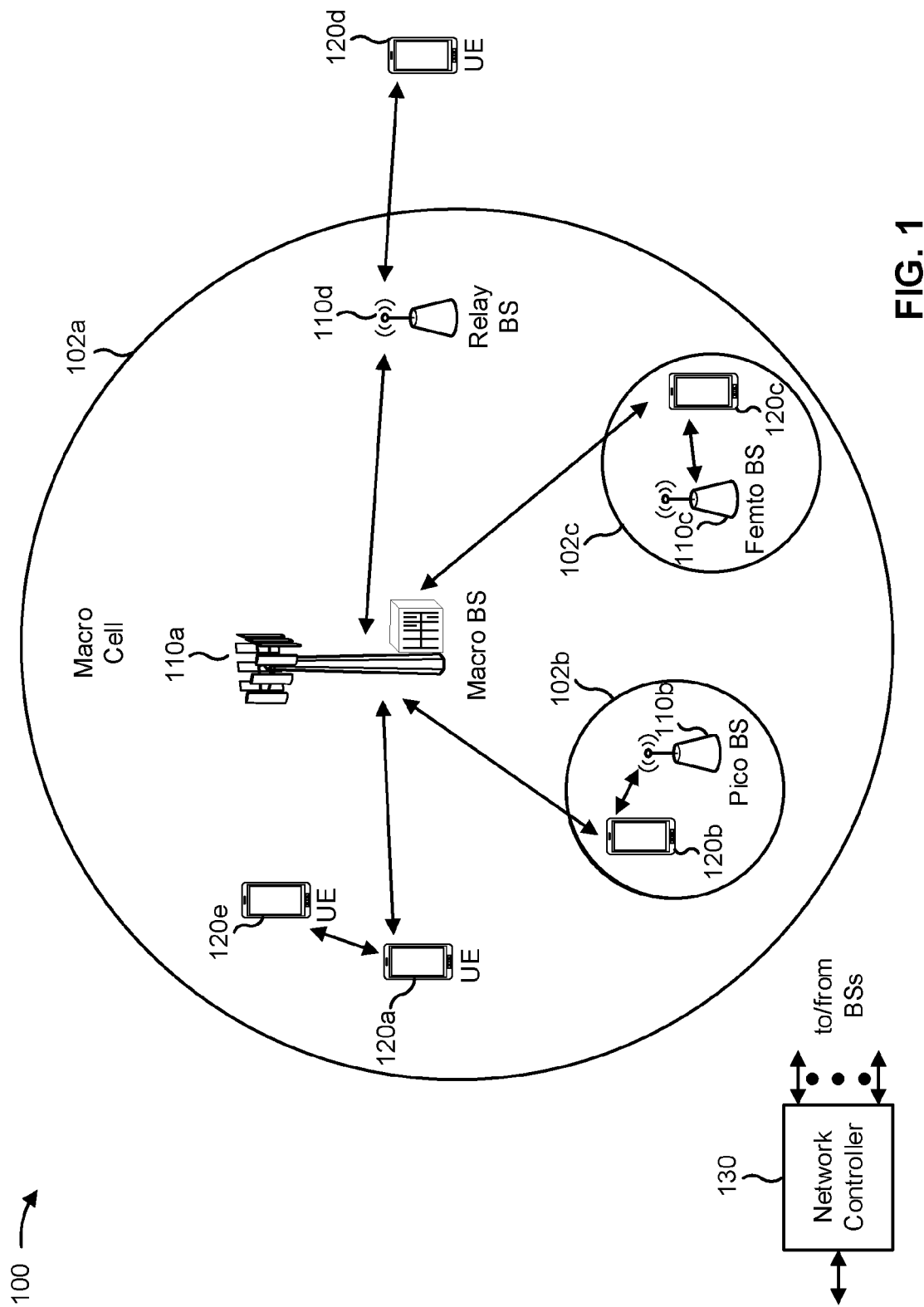
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR B S, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5 G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, a vehicle-to-pedestrian (V2P) protocol, and/or a vehicle-to-network (V2N) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
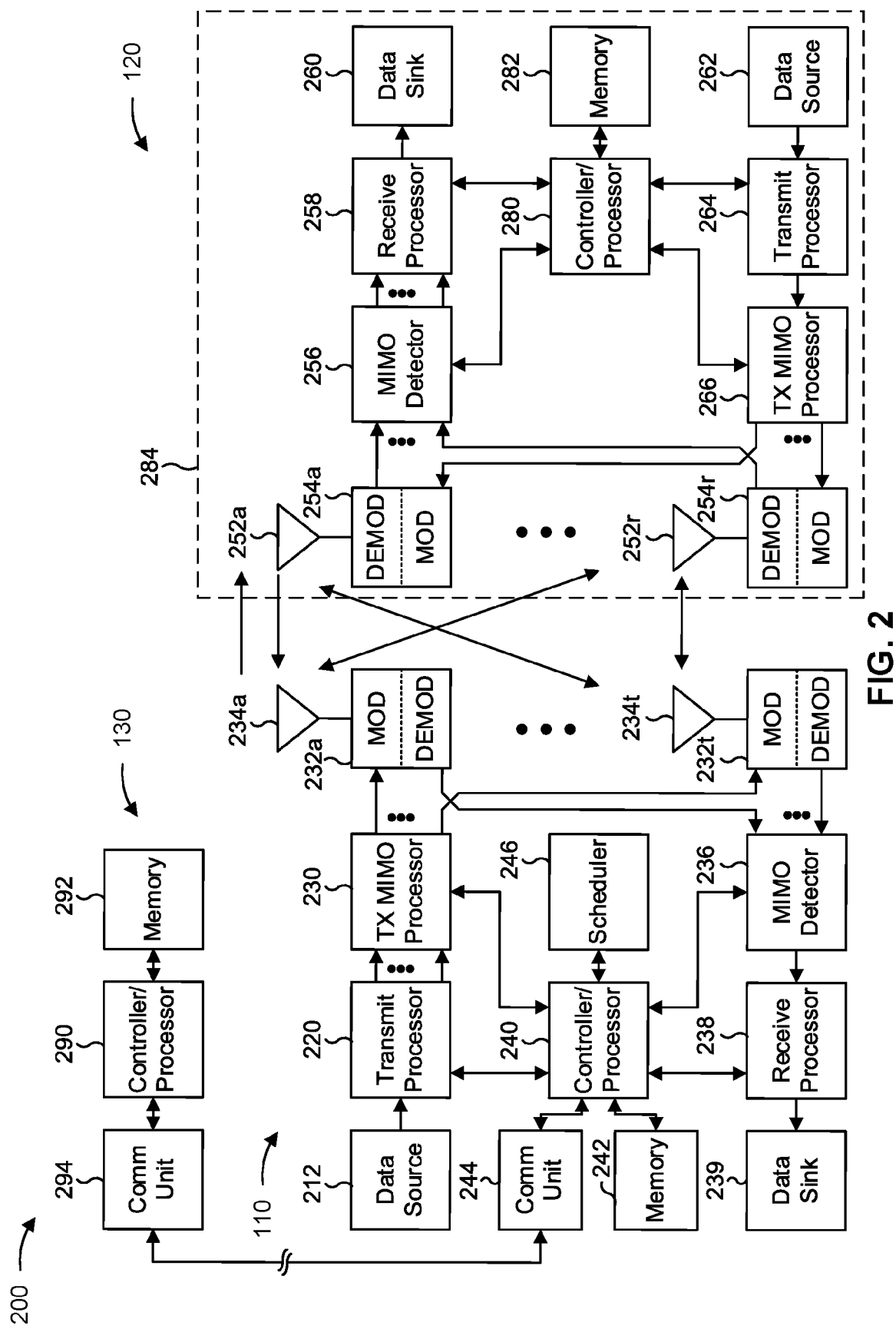
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7A-7C.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7A-7C.

Controller/processor 240 of base station 110, controller/processor 280 of UE 120, and/or any other component(s) of FIG. 2 may perform one or more techniques associated with assisted resource reservation for sidelink communication with low transmit power, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting)

by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, and/or interpreting the instructions, among other examples.

In some aspects, the UE 120 includes means for determining, within a resource selection window, one or more resources to reserve in a shared resource pool for an internal sidelink transmission within a disaggregated UE group including the UE 120 and one or more assisted UEs; and/or means for transmitting, over a sidelink, an assisting reservation message indicating a lower RSRP to project onto the one or more resources reserved for the internal sidelink transmission relative to a measured RSRP that is based at least in part on a transmit power associated with the assisting reservation message. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for transmitting the internal sidelink transmission using a transmit power that is lower than the transmit power associated with the assisting reservation message.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
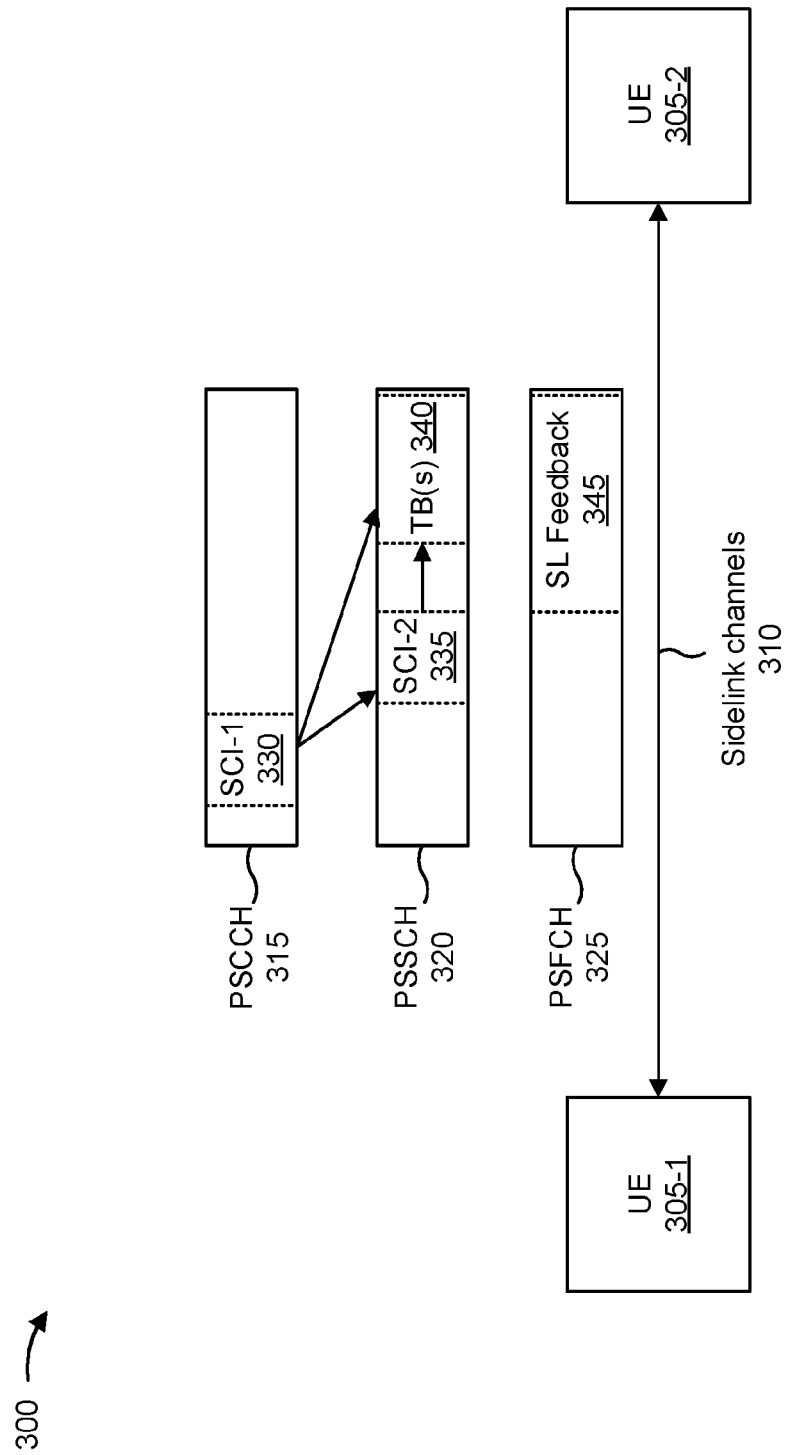
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or V2N communications), mesh networking, and/or uplink or downlink relaying to extend network coverage and/or save power (e.g., for a reduced capability UE), among other examples. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band) or an unlicensed or shared frequency band (e.g., an NR unlicensed (NR-U) frequency band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

For example, in some aspects, the PSCCH 315 may carry sidelink control information (SCI), which may indicate various parameters and/or other control information used for sidelink communications. For example, in some aspects, the SCI may include stage one SCI (SCI-1) 330, which may include an indication of one or more resources (e.g., time resources, frequency resources, and/or spatial resources) where a transport block (TB) 340 that includes data may be carried on the PSSCH 320. Furthermore, in some aspects, the SCI-1 330 may include information for decoding sidelink communications on the PSSCH 320, a priority (e.g., a quality of service (QoS) value), a resource reservation period, a PSSCH DMRS pattern, an SCI format and a beta offset for stage two sidelink control information (SCI-2) 335 transmitted on the PSSCH 320, a quantity of PSSCH DMRS ports, and/or an MCS, among other examples.

In some aspects, the information carried on the PSSCH 320 may include the SCI-2 335 and/or the TB 340 that includes the data. The SCI-2 335 may include various types of information, such as a hybrid automatic repeat request (HARQ) process identifier, a new data indicator (NDI), a source identifier, and a destination identifier associated with the TB 340 carried on the PSSCH 320. In some aspects, the HARQ process identifier, NDI, source identifier, and destination identifier may be used to determine whether the TB 340 carried on the PSSCH 320 is a new transmission or a retransmission. Furthermore, in cases where the sidelink channels 310 are configured for unicast communication, the SCI-2 335 may include a channel state information (CSI) report trigger. Alternatively, in cases where the sidelink channels 310 are configured for groupcast communication (e.g., using a negative acknowledgement-only distance-based feedback), the SCI-2 335 may include a zone identifier that indicates a location of the transmitter and a maximum communication range for sending feedback on the PSFCH 325. In some aspects, a UE 305 may transmit both the SCI-1 330 and the SCI-2 335. In some aspects, a UE 305 may transmit only SCI-1 330, in which case one or more types of the information that would otherwise be transmitted in the SCI-2 335 may be transmitted in the SCI-1 330 instead.

The PSFCH 325 may be used to communicate sidelink feedback 345, such as HARQ feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI-1 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, as described in further detail below with reference to FIG. 5, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI-1 330 received in the PSCCH 315, which may indicate occupied resources and/or channel parameters. Additionally, or alternatively, the UE 305 may perform resource selection and/or scheduling by determining a channel busy rate (CBR) associated with various sidelink channels 310, which may be used for rate control (e.g., by indicating a maximum number of RBs that the UE 305 can use for a particular set of subframes).

In the transmission mode where resource selection and/or scheduling is performed by a UE 305, the UE 305 may generate sidelink grants, and may transmit the grants in SCI-1 330 and/or SCI-2 335. A sidelink grant may indicate, for example, one or more parameters (e.g., transmission parameters) to be used for an upcoming sidelink transmission, such as one or more RBs to be used for the upcoming sidelink transmission on the PSSCH 320 (e.g., for TBs 340), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
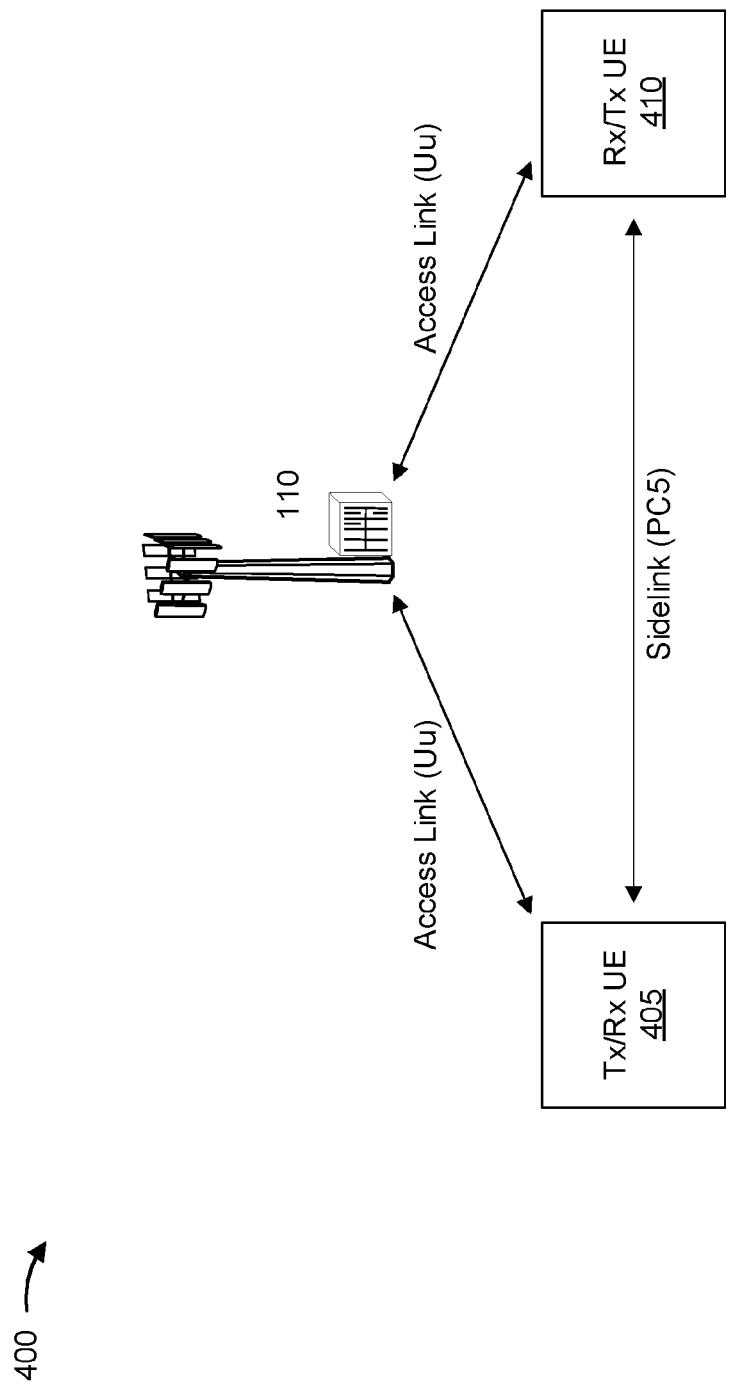
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1 and/or the UEs 305 of FIG. 3. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the Tx/Rx UE 405 and the Rx/Tx UE 410 may operate in a resource allocation mode in which the base station 110 reserves and allocates sidelink resources for the Tx/Rx UE 405 and the Rx/Tx UE 410. This may be referred to as sidelink resource allocation mode 1. In some aspects, the Tx/Rx UE 405 and the Rx/Tx UE 410 may operate in a resource allocation mode in which sidelink resource selection and/or scheduling is performed by the Tx/Rx UE 405 and/or the Rx/Tx UE 410 (e.g., rather than the base station 110). This may be referred to as sidelink resource allocation mode 2. In a scheme based on sidelink resource allocation mode 2, the base station 110 may transmit a sidelink grant to the Tx/Rx UE 405 and/or the Rx/Tx UE 410 via the access link. The sidelink grant may be a dynamic grant (e.g., received in a downlink control information (DCI) communication) or a semi-static/configured grant (e.g., received in a radio resource control (RRC) communication). For semi-static/configured grants, the base station 110 may activate a sidelink grant in the same RRC communication that configures the sidelink grant (referred to as a Type 1 configured grant) or may activate the sidelink grant in a DCI communication (referred to as a Type 2 configured grant). In some aspects, signaling on the sidelink (via the PC5 interface) may be the same in schemes that are based on sidelink resource allocation mode 1 and sidelink resource allocation mode 2 (e.g., there may be no observable difference between the two modes from the perspective of a receiving UE).

As indicated above, FIG. 4 is provided as an example. Other examples may differ from what is described with respect to FIG. 4.

Figure 5:
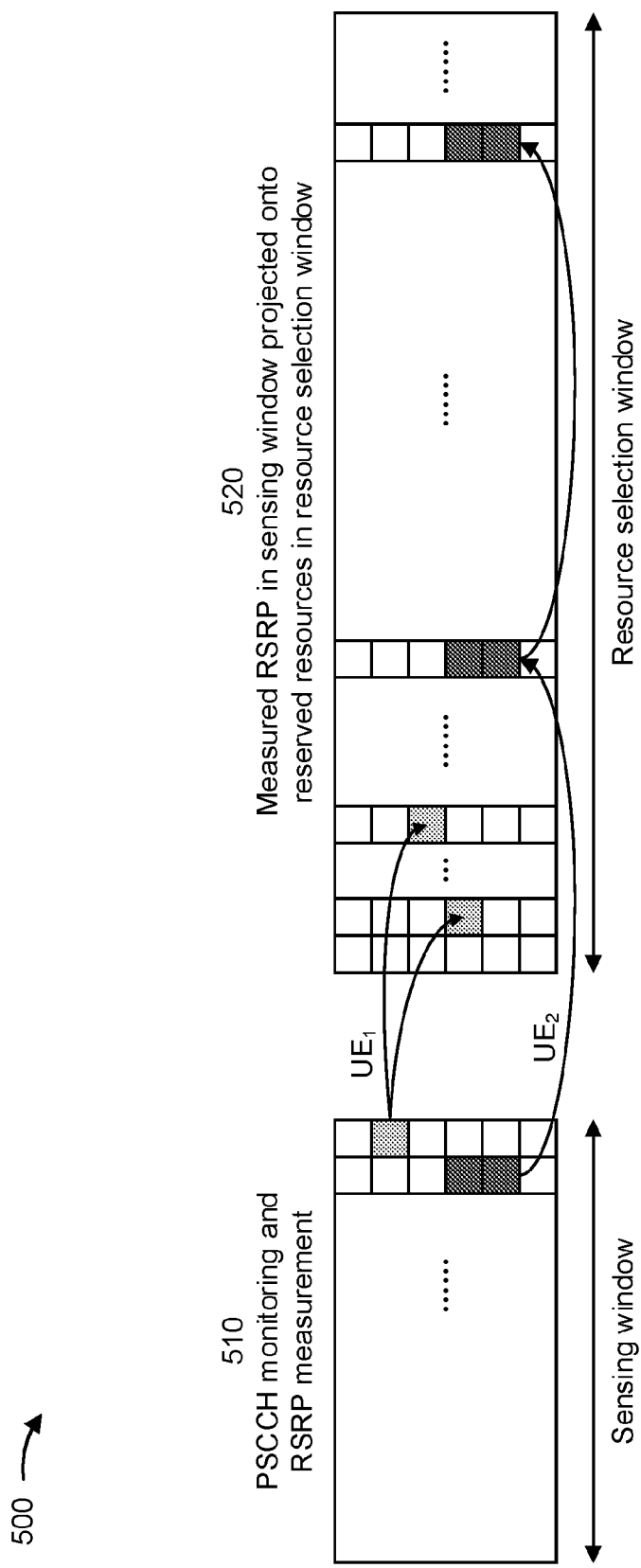
FIG. 5 is a diagram illustrating an example of sidelink resource selection and resource reservation, in accordance with the present disclosure.

FIG. 5 is a diagram illustrating an example 500 of sidelink resource selection and resource reservation, in accordance with the present disclosure. In some aspects, as described herein, example 500 relates to sidelink resource selection and resource reservation techniques that may be used in a resource allocation mode in which sidelink resource selection and/or scheduling is performed by a transmitting UE and/or a receiving UE (e.g., sidelink resource allocation mode 2).

For example, in sidelink resource allocation mode 2, which may also be referred to as an autonomous resource selection mode, UEs that communicate on a sidelink may perform exhaustive sidelink monitoring using a resource selection procedure in which time and frequency resources used for sidelink communication are randomly selected from a candidate resource set that is identified by sensing and exclusion. For example, as described herein, the exhaustive sidelink monitoring may include decoding SCI for all potential transmissions in all slots and subchannels within a resource pool. The decoded SCI generally includes SCI-1 transmitted on a PSCCH, which is blindly decoded by all UEs, and the decoded SCI may further include SCI-2 transmitted on a PSSCH (e.g., if the SCI-1 is decoded). Accordingly, for receiving purposes, a UE may perform exhaustive sidelink monitoring in all sidelink slots and subchannels to decode SCI for a potential transmission to be received by the UE. Additionally, or alternatively, for transmitting purposes, a UE may perform exhaustive sidelink monitoring and sensing in all slots and subchannels to identify resources that are available for a sidelink transmission.

For example, as shown in FIG. 5, and by reference number 510, a UE that performs a resource selection procedure in sidelink resource allocation mode 2 may exhaustively monitor all slots and subchannels associated with a PSCCH during a sensing window for one or more SCI transmissions that reserve resources for an upcoming sidelink transmission. Accordingly, the UE may decode any SCI transmissions that are detected during the sensing window to determine resources that other UEs are occupying in the future (e.g., in a resource selection window subsequent to the sensing window), and the UE may be excluded from using resources that other UEs are occupying within the resource selection window. For example, in some aspects, the UE may measure an RSRP associated with one or more SCI transmissions that are decoded within the sensing window, and may further determine the resources that are reserved by the SCI transmission(s) within the resource selection window.

As further shown in FIG. 5, and by reference number 520, the measured RSRP associated with the decoded SCI within the sensing window may be projected onto the resources that the decoded SCI reserves within the resource selection window. For example, as shown in FIG. 5, a UE may decode and measure an RSRP associated with a first SCI transmission from a first UE (shown as $UE_1$), and the UE may further decode and measure an RSRP associated with a second SCI transmission from a second UE (shown as $UE_2$) when performing PSSCH monitoring and RSRP measurement during the sensing window as part of a resource selection and reservation procedure. Accordingly, the UE may determine the time and frequency resources reserved by the first SCI transmission and the second SCI transmission, and may project the measured RSRPs associated with the first and second SCI transmissions onto the respective time and frequency resources that the first and second SCI transmissions reserve within the resource selection window (e.g., an SCI transmission and a PSSCH transmission scheduled by the SCI transmission may be expected to have the same or similar RSRP).

In some aspects, within the resource selection window, resources associated with an RSRP that fails to satisfy (e.g., is below) a threshold are considered available, where the threshold may be based at least in part on a transmit priority associated with the transmitting UE and a receive priority that is indicated in the decoded SCI. Accordingly, in cases where the proportion of available resources in the resource selection window fails to satisfy (e.g., is below) a threshold, such as 20% or another suitable value, the RSRP threshold may be increased (e.g., by three (3) decibels or another suitable value) and the candidate resource identification process may be repeated. Alternatively, in cases where the proportion of available resources in the resource selection window satisfies (e.g., equals or exceeds) the threshold, the available resources in the resource selection window form a candidate resource set, which the UE reports to higher layers for random resource selection. The UE may then perform the sidelink transmission using one or more available resources that are randomly selected from the candidate resource set.

As indicated above, FIG. 5 is provided as an example. Other examples may differ from what is described with respect to FIG. 5.

Figure 6:
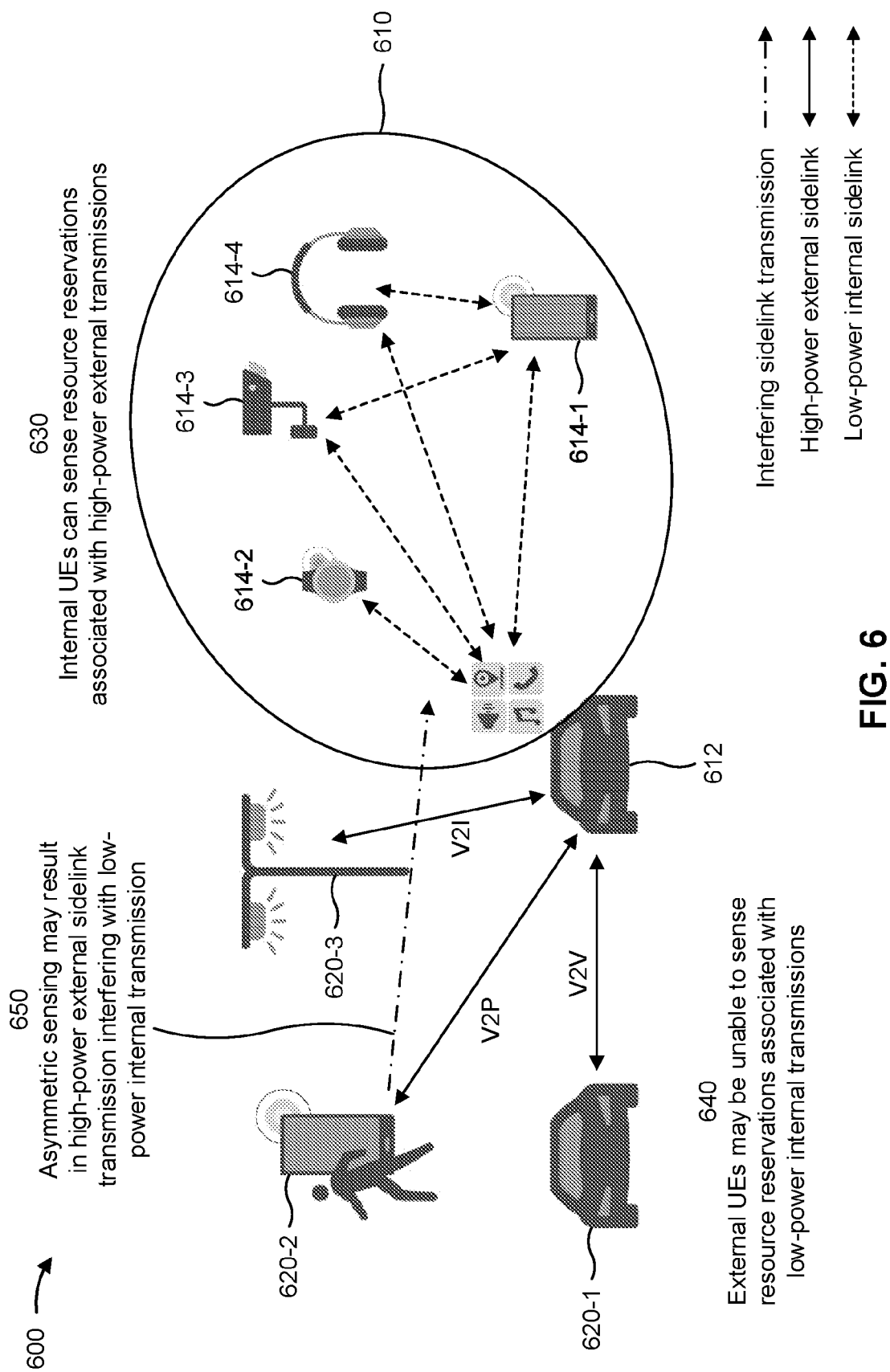
FIG. 6 is a diagram illustrating an example of asymmetric sensing associated with low-power sidelink communication and high-power sidelink communication, in accordance with the present disclosure.

FIG. 6 is a diagram illustrating an example 600 of asymmetric sensing associated with low-power sidelink communication and high-power sidelink communication, in accordance with the present disclosure.

In some aspects, as described above, example use cases for sidelink communication may include P2P communications, D2D communications, V2X communications (e.g., V2V communications, V2I communications, V2P communications, and/or V2N communications), mesh networking, and/or uplink or downlink relaying to extend network coverage and/or save power (e.g., for a reduced capability (RedCap) UE, sometimes referred to as a low tier UE and/or an NR-Lite UE, such as a wearable device, an industrial wireless sensor network device, and/or a surveillance camera, among other examples). In general, relative to a premium UE (e.g., a smartphone or connected vehicle), a RedCap UE may support a lower maximum modulation and coding scheme (MCS), may support a lower maximum transmit power, may have a less advanced beamforming capability, may require a longer processing times, may include less hardware (e.g., fewer transmit and/or receive antennas), and/or may support a narrower maximum bandwidth, among other examples.

Accordingly, another example use case for sidelink communication may include internal communication within a disaggregated UE group that includes at least one assisting UE (e.g., a premium UE) and one or more assisted UEs (e.g., RedCap UEs and/or other premium UEs). For example, when a disaggregated UE group is configured in a home IoT scenario, the assisting UE may be a home CPE and the assisted UE(s) may include a camera, a thermostat, a door sensor, switch controls, a voice assistant device, and/or a home appliance, among other examples. In another example, in an in-car IoT scenario, the assisting UE may be an intelligent cockpit (e.g., a vehicle that has an on-board communication device) and the assisted UE(s) may include a vehicle sensor, a camera, earphones, and/or a smartphone, among other examples. In still another example, in a personal IoT scenario, the assisting UE in the disaggregated UE group may be a smartphone, and the assisted UE(s) may include a wearable device (e.g., a smart watch or a smart wristband), extended reality (XR) glasses, earphones, and/or a health monitoring sensor, among other examples. For instance, in the example 600 illustrated FIG. 6, a disaggregated UE group 610 may be configured in an in-car scenario, where an assisting UE 612 is an intelligent cockpit and assisted UEs 614-1 through 614-4 include a smartphone, a smart watch, a vehicle sensor, and wireless headphones).

Accordingly, in some aspects, sidelink communication may be used for internal communications between the assisting UE 612 and the assisted UE(s) 614 and/or among the assisted UEs 614. Furthermore, in some aspects, the assisting UE 612 and/or one or more assisted UEs 614 that have suitable capabilities (e.g., the smartphone UE 614-1, which can function as a premium UE or an assisting UE 612 in a personal IoT scenario and/or other scenarios) may use sidelink communication to communicate with other external UEs (e.g., UEs that are not included in the disaggregated UE group 610). For example, in FIG. 6, the assisting UE 612 associated with the disaggregated UE group 610 may communicate on a sidelink with another vehicle UE 620-1 using a V2V protocol, with a pedestrian UE 620-2 (e.g., a smartphone or wearable device) using a V2P protocol, and/or with an infrastructure UE 620-3 (e.g., a roadside unit or traffic infrastructure) using a V2I protocol, among other examples. In some cases, the combination of internal sidelink communication within the disaggregated UE group 610 and external sidelink communication outside the disaggregated UE group 610 may result in asymmetric sensing that tends to deprioritize the internal sidelink communication within the disaggregated UE group 610.

For example, because the assisting UE 612 and the assisted UE(s) 614 forming the disaggregated UE group may be in close physical proximity and/or one or more assisted UEs 614 may have reduced capabilities, internal sidelink communication within the disaggregated UE group 610 may generally include low-power transmissions over a short range. On the other hand, the sidelink communication with the external UEs 620 may occur over a relatively long range between different premium UEs, whereby external sidelink communication outside the disaggregated UE group 610 may be performed using a high transmission power. Accordingly, in some cases, asymmetric sensing challenges may arise when the high-power long-range external sidelink communication and the low-power short-range internal sidelink communication use a shared resource pool (e.g., for improved efficiency). For example, as shown in FIG. 6, and by reference number 630, the UEs 612, 614 within disaggregated UE group 610 may be able to sense resource reservations associated with high-power external transmissions by the external UEs 620. However, as shown by reference number 640, the external UEs 620 may be unable to sense resource reservations associated with low-power internal transmissions within the disaggregated UE group 610. As a result, as shown by reference number 650, the asymmetric sensing (e.g., where UEs 612, 614 within the disaggregated UE group 610 can sense resource reservations by the external UEs 620 but the external UEs 620 may be unable to sense resource reservations by the internal UEs 612, 614) can result in a high-power external sidelink transmission causing interference with low-power internal transmissions within the disaggregated UE group 610. For example, because the resource reservations within the disaggregated UE group 610 are transmitted with low power, the external UEs 620 may fail to identify resources that are reserved for the low-power internal transmissions and potentially cause interference with the low-power internal transmissions by using the reserved resources.

Some aspects described herein relate to techniques and apparatuses for assisted resource reservation for sidelink communication with low transmit power. For example, in a disaggregated UE group that includes an assisting UE and one or more assisted UEs, a UE initiating an internal sidelink transmission may perform a sensing procedure during a sensing window to identify resources in a resource selection window that are available for the internal sidelink transmission. Accordingly, the assisting UE may transmit an assisting reservation message that indicates the resources reserved for the internal sidelink transmission using a high transmit power (e.g., to improve detection of the assisting reservation message). In this way, external UEs that are outside the disaggregated UE group may identify the resources that are occupied or otherwise reserved by the internal sidelink transmission, and may avoid causing interference with the internal sidelink transmission by excluding the identified resources from the candidate resource set that represents resources available to the external UEs. Furthermore, because the assisting reservation message is transmitted at a high power and the internal sidelink transmission is associated with a low transmit power, the assisting reservation message may indicate that an RSRP to project to a resource selection window is to be lower than a measured RSRP associated with the assisting reservation message (e.g., a measured RSRP at an external UE receiving the assisting reservation message). In this way, different disaggregated UEs may use the same sidelink resources for internal sidelink communication (e.g., the low-power internal sidelink transmissions may only exclude high-power, potentially interfering transmissions), which increases a resource reuse factor and enables sidelink communication to have a larger overall capacity.

As indicated above, FIG. 6 is provided as an example. Other examples may differ from what is described with respect to FIG. 6.

Figure 7A:
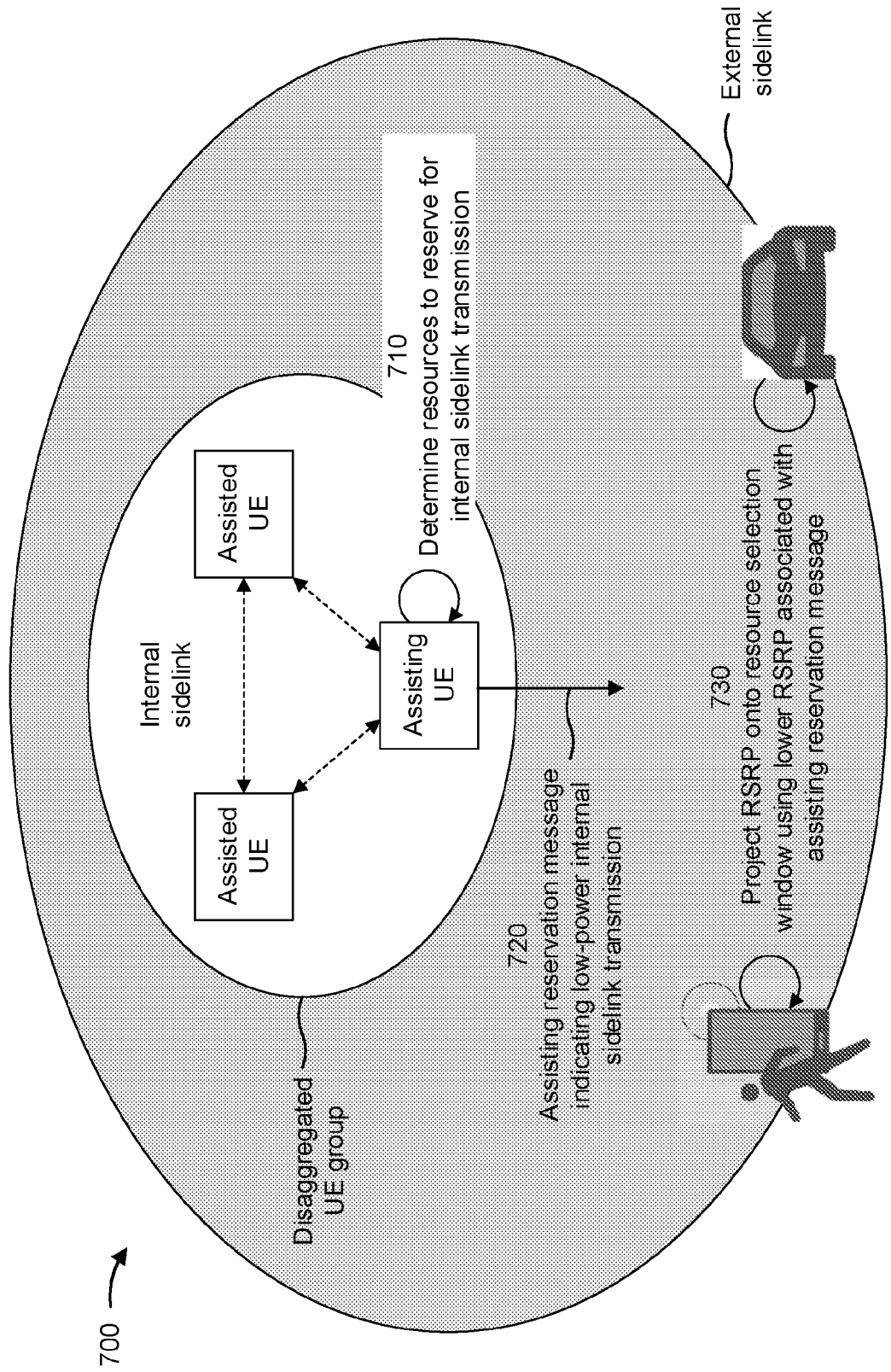
FIGS. 7A-7C are diagrams illustrating examples associated with assisted resource reservation for sidelink communication with low transmit power, in accordance with the present disclosure.
Figure 7B:
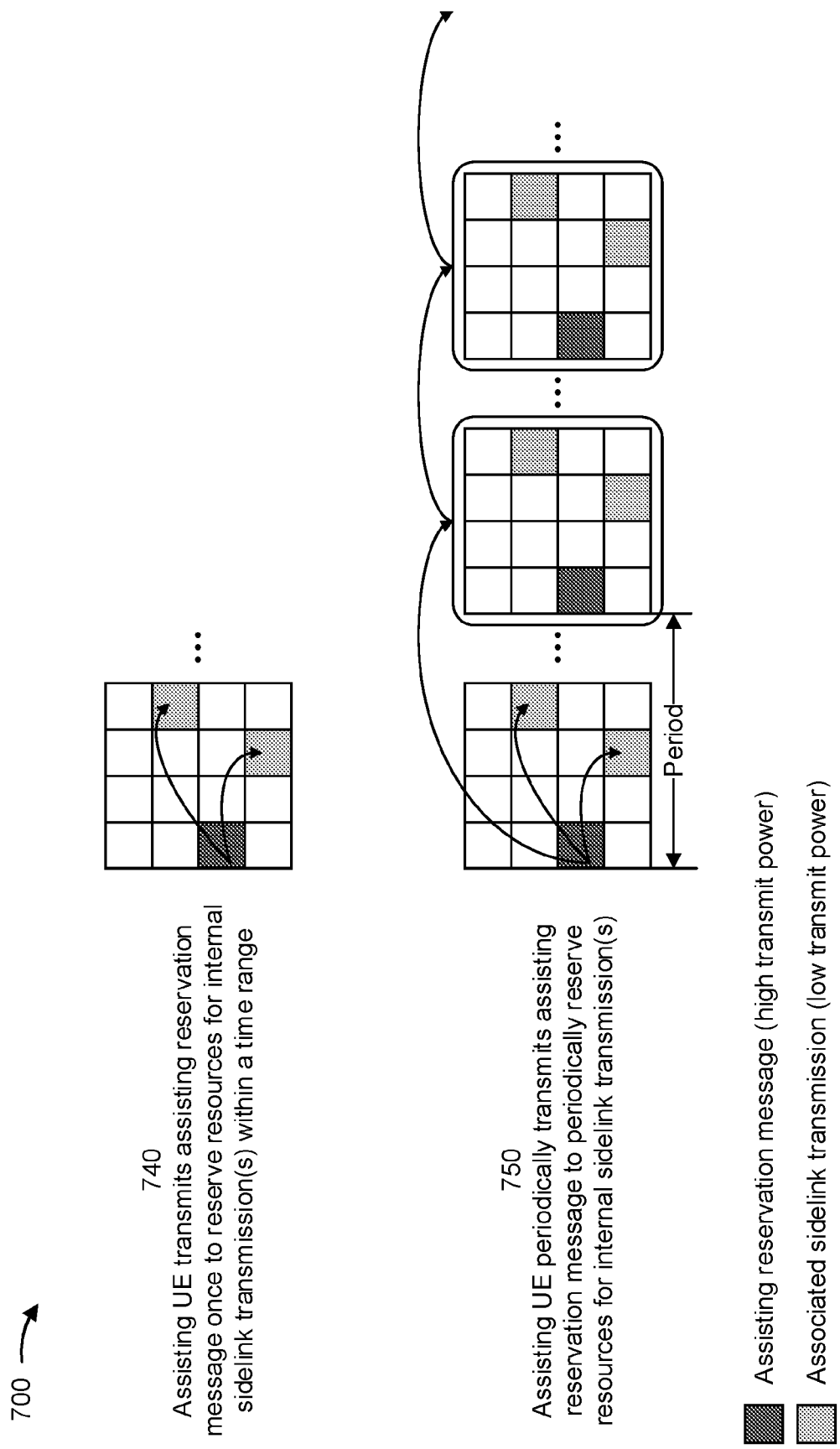
Figure 7C:
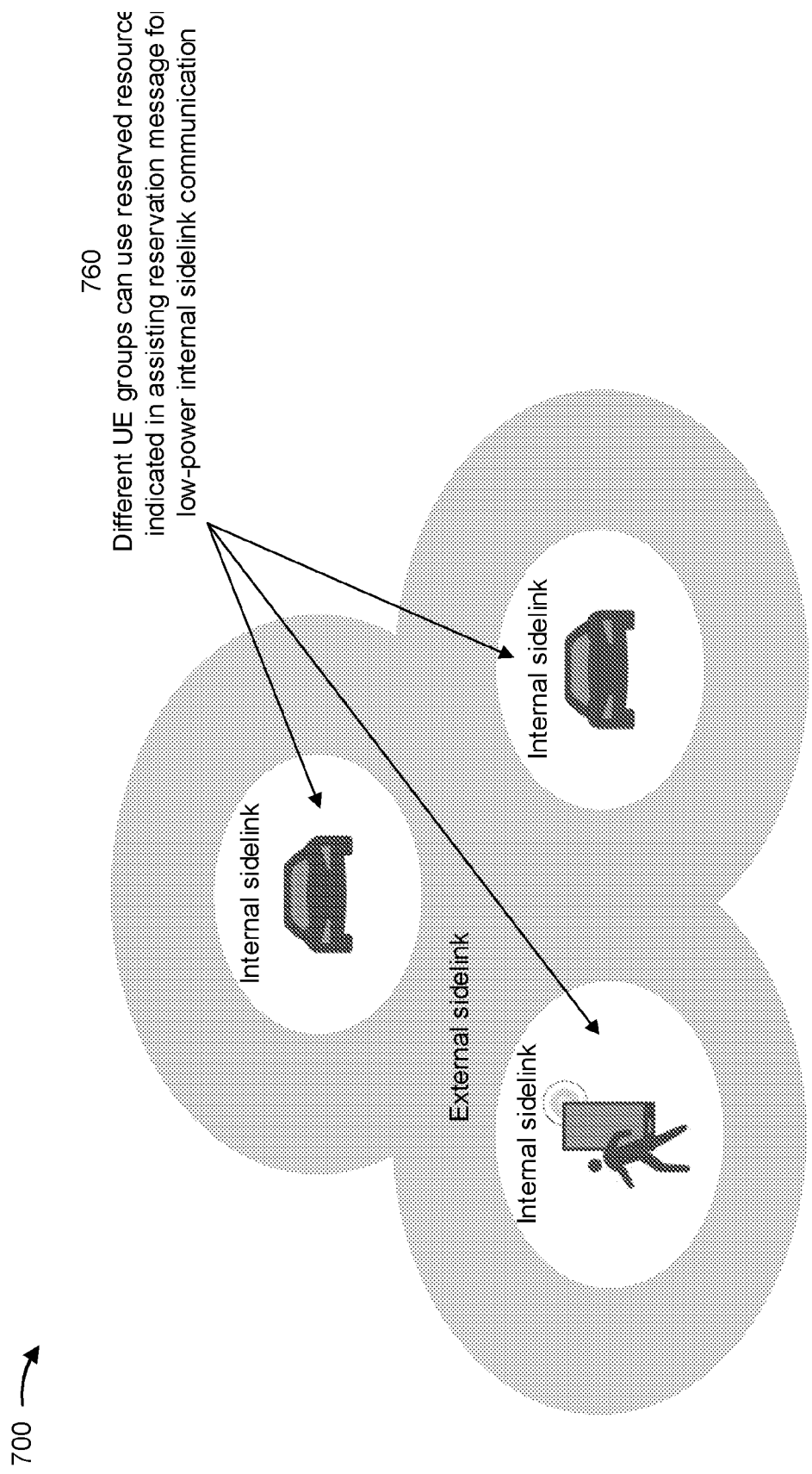

FIGS. 7A-7C are diagrams illustrating examples 700 associated with assisted resource reservation for sidelink communication with low transmit power, in accordance with the present disclosure. As shown in FIGS. 7A-7C, examples 700 include internal sidelink communication within a disaggregated UE group that includes an assisting UE and one or more assisted UEs. In addition, as further shown in FIGS. 7A-7C, examples 700 include external sidelink communication between one or more UEs in the disaggregated UE group and other (external) UEs that are not included in the disaggregated UE group. In some aspects, the assisting UE, the assisted UE(s), and the external UE(s) may be included in a wireless network, such as wireless network 100, and may communicate via a wireless sidelink (e.g., over a PC5 interface). In some aspects, the internal sidelink communication within the disaggregated UE group and the external sidelink communication outside the disaggregated UE group (e.g., in the shaded area) may be associated with a shared resource pool in which resource allocation is performed in an autonomous mode, which may also be referred to as sidelink resource allocation mode 2 (e.g., where resources are reserved based on identification of candidate resources by sensing and exclusion and random selection of available resources from a candidate resource set, as described above with reference to FIG. 5).

As shown in FIG. 7A, and by reference number 710, the assisting UE may determine one or more resources to reserve for an internal sidelink transmission within the disaggregated UE group. For example, in some aspects, the internal sidelink transmission may be an internal sidelink transmission by the assisting UE (e.g., to the assisted UE(s)) or an internal sidelink transmission by an assisted UE (e.g., to the assisting UE and/or other assisted UE(s)). In general, the resources to reserve for the internal sidelink transmission may be determined in an autonomous mode. For example, a UE may perform exhaustive sidelink monitoring during a sensing window to detect sidelink control information (SCI) that reserves resources in a resource selection window subsequent to the sensing window. In particular, as described above, a UE performing autonomous resource selection may measure an RSRP associated with the SCI detected in the sensing window, decode the SCI to determine the resources reserved by the SCI in the resource selection window, and project the measured RSRP associated with the SCI onto the resources that are reserved by the SCI in the resource selection window. Accordingly, resources in the resource selection window with an RSRP below a threshold are considered available and form a candidate resource set that is reported to higher layers for random resource selection if the proportion of available resources in the resource selection window is below a threshold. However, in cases where the SCI that is transmitted within the disaggregated UE group to reserve resources for an internal sidelink transmission, the external UEs may fail to detect the SCI because the internal transmissions within the disaggregated UE group are performed at a low power.

Accordingly, as further shown in FIG. 7A, and by reference number 720, the assisting UE may transmit an assisting reservation message in a sensing window prior to a resource selection window in order to reserve resources for the internal sidelink transmission within the resource selection window. Furthermore, to improve detection by external UEs that are outside the disaggregated UE group, the assisting UE may transmit the assisting reservation message using a transmit power that is higher than a maximum transmit power for the internal sidelink transmission associated with the assisting reservation message. In some aspects, because the assisting reservation message is generally transmitted at a higher transmit power than will be used for the internal sidelink transmission, the assisting reservation message may indicate that an external UE receiving the assisting reservation message is to project a lower RSRP onto the resources that are reserved by the assisting reservation message relative to a measured RSRP that is based on the higher transmit power of the assisting reservation message. For example, an external UE that detects the assisting reservation message in the sensing window may measure the RSRP of the assisting reservation message to determine the appropriate candidate resource set available for the external UE in the same or a similar manner as described above (e.g., by projecting the measured RSRP onto the resources reserved by the assisting reservation message).

Accordingly, because the internal sidelink transmission has a maximum transmit power that is lower than the transmit power used for the assisting reservation message, the assisting reservation message may indicate a lower RSRP that is to be projected onto the resources reserved by the assisting reservation message. For example, in some aspects, the assisting reservation message may indicate a power offset over the assisting reservation message that is to be applied for the associated sidelink transmission reserved by the assisting reservation message. For example, the power offset may have a negative value that an external UE is to add to the measured RSRP of the assisting reservation message to determine the lower RSRP value to be projected onto the resources reserved by the assisting reservation message. Additionally, or alternatively, the assisting reservation message may indicate a maximum transmit power limit for the internal sidelink transmission associated with the assisting reservation message. For example, the assisting reservation message may indicate an absolute value as the maximum transmit power limit for the internal sidelink transmission. Additionally, or alternatively, the shared resource pool for internal and external sidelink communication may be configured with multiple maximum transmit power limits, and the assisting reservation message may indicate one of the maximum transmit power limits that apply to the internal sidelink transmission.

As further shown in FIG. 7A, and by reference number 730, one or more external UEs that detect the assisting reservation message may project an RSRP onto the resources reserved by the assisting reservation message within a resource selection window using a lower RSRP than a measured RSRP associated with the assisting reservation message. For example, in cases where the assisting reservation message indicates a power offset over the assisting reservation message, each external UE that receives the assisting reservation message may measure the RSRP associated with the received assisting reservation message, and may apply the (negative) power offset indicated by the assisting reservation message to determine the lower RSRP to be projected onto the reserved resources in the resource selection window. Alternatively, in cases where the assisting reservation message indicates the maximum transmit power limit for the internal sidelink transmission, the external UE(s) that receive the assisting reservation message may determine the lower RSRP to project onto the reserved resources in the resource selection window based on the maximum transmit power limit for the internal sidelink transmission (e.g., regardless of the measured RSRP associated with the assisting reservation message within the sensing window). Accordingly, the external UEs may then use the projected RSRP associated with the internal sidelink transmission for threshold comparison (e.g., to determine the resources within the resource selection window with a projected RSRP below a threshold, which represents the resources available for sidelink transmissions by the external UEs). In this way, the external UEs may take the resource reservations for internal sidelink communications into consideration when performing autonomous resource selection. Furthermore, although the assisting reservation message may generally inform external UEs about the resources reserved for internal sidelink transmissions, an external sidelink transmission may preempt the resource reserved for the internal sidelink transmission based on the comparison between the projected RSRP and the threshold that is determined by a pair of priorities, which include a transmit priority and a receive priority.

In some aspects, as described above, the internal sidelink communication associated with the assisting reservation message may be transmitted by the assisting UE (e.g., using a lower transmit power than the assisting reservation message) or by an assisted UE. In the latter case, where the transmitting UE is an assisted UE (or any other UE other than the assisting UE that transmits the assisting reservation message), the assisting reservation message may indicate an RSRP uncertainty value. For example, different UEs in the disaggregated UE group may be at different locations, whereby the actual RSRP that the internal sidelink transmission causes at an external UE may vary depending on the location of the transmitting UE. Accordingly, because the assisted UE transmitting the internal sidelink transmission may be at a different location than the assisting UE transmitting the assisting reservation message, the assisting reservation message may indicate an RSRP uncertainty based on the relative locations of the assisting UE and the assisted UE that will be transmitting the internal sidelink transmission.

In some aspects, as described above, the assisting UE may transmit the assisting reservation message in a sensing window prior to a resource selection window in which the internal sidelink transmission is scheduled in order to reserve one or more resources for the internal sidelink transmission within the resource selection window. For example, as shown in FIG. 7B, and by reference number 740, the assisting UE may transmit the assisting reservation message once in order to reserve resources for the internal sidelink transmission within a certain time range. For example, as shown in FIG. 7B, the resource used to transmit the assisting reservation message is represented by the dark shaded area, and is transmitted to reserve one or more resources for the associated internal sidelink transmission, which is represented by the lightly shaded area. Accordingly, for a one-time resource reservation, the assisting UE may transmit the assisting reservation message at a high power in the sensing window prior to the resource selection window in which the low-power internal sidelink transmission is to be transmitted. However, in some cases, the internal sidelink transmission may be a periodic transmission. In such cases, the low-power internal sidelink transmission may cease to be visible or otherwise detectable by external UEs. Accordingly, in some aspects, as shown by reference number 750, the assisting UE may periodically transmit the assisting reservation message (e.g., once per period) in order to periodically reserve resources for the periodic internal sidelink transmission(s).

As shown in FIG. 7C, and by reference number 760, different UE groups may be permitted to use reserved resources that are indicated in the assisting reservation message for low-power internal sidelink communication. For example, in some aspects, the assisting reservation message may indicate a maximum transmit power limit that the external UEs are permitted to use if and/or when the external UEs perform sidelink transmissions using the resources that are reserved for the internal sidelink transmission. For example, in some aspects, the external UEs may be permitted to transmit using the reserved resources indicated in the assisting reservation message provided that the transmissions are performed using a transmit power that satisfies (e.g., is less than or equal to) a threshold. For example, as described above, the assisting reservation message may indicate a maximum transmit power level for the internal sidelink transmission, and the external UEs that receive the assisting reservation message may transmit using the reserved resources indicated in the assisting reservation message at a transmit power that is lower than maximum transmit power level for the internal sidelink transmission. In this way, internal sidelink communication within disaggregated UE groups associated with different assisting UEs can use the same sidelink resources without interfering with internal sidelink communication in other disaggregated UE groups, which increases the resource reuse factor the sidelink resources within the shared resource pool and/or increases overall capacity for sidelink communication.

As indicated above, FIGS. 7A-7C are provided as examples. Other examples may differ from what is described with respect to FIGS. 7A-7C.

FIG. 8 is a diagram illustrating an example process 800 performed, for example, by an assisting UE, in accordance with the present disclosure. Example process 800 is an example where the UE (e.g., UE 120, UE 305, Tx/Rx UE 405, Rx/Tx UE 410, UE 612, UE 614, and/or UE 620) performs operations associated with assisted resource reservation for sidelink communication with low transmit power.

As shown in FIG. 8, in some aspects, process 800 may include determining, within a resource selection window, one or more resources to reserve in a shared resource pool for an internal sidelink transmission within a disaggregated UE group including the assisting UE and one or more assisted UEs (block 810). For example, the UE (e.g., using determination component 908, depicted in FIG. 9) may determine, within a resource selection window, one or more resources to reserve in a shared resource pool for an internal sidelink transmission within a disaggregated UE group including the assisting UE and one or more assisted UEs, as described above.

As further shown in FIG. 8, in some aspects, process 800 may include transmitting, over a sidelink, an assisting reservation message indicating a lower RSRP to project onto the one or more resources reserved for the internal sidelink transmission relative to a measured RSRP that is based at least in part on a transmit power associated with the assisting reservation message (block 820). For example, the UE (e.g., using transmission component 904, depicted in FIG. 9) may transmit, over a sidelink, an assisting reservation message indicating a lower reference signal received power (RSRP) to project onto the one or more resources reserved for the internal sidelink transmission relative to a measured RSRP that is based at least in part on a transmit power associated with the assisting reservation message, as described above.

Process 800 may include additional aspects, such as any single aspect or any combination of aspects described below and/or in connection with one or more other processes described elsewhere herein.

With respect to process 800, in a first aspect, the transmit power associated with the assisting reservation message is higher than a maximum transmit power for the internal sidelink transmission within the disaggregated UE group.

With respect to process 800, in a second aspect, alone or in combination with the first aspect, the lower RSRP to project onto the one or more resources reserved for the internal sidelink transmission is indicated according to a power offset over the assisting reservation message.

With respect to process 800, in a third aspect, alone or in combination with the first aspect, the lower RSRP to project onto the one or more resources reserved for the internal sidelink transmission is indicated according to a maximum transmit power for the internal sidelink transmission.

With respect to process 800, in a fourth aspect, in combination with the third aspect, the assisting reservation message indicates the maximum transmit power for the internal sidelink transmission among multiple maximum transmit power levels associated with the shared resource pool.

With respect to process 800, in a fifth aspect, alone or in combination with one or more of the first through fourth aspects, the assisting reservation message is transmitted in a sensing window prior to the resource selection window to reserve the one or more resources for the internal sidelink transmission within the resource selection window.

With respect to process 800, in a sixth aspect, alone or in combination with one or more of the first through fifth aspects, the assisting reservation message is periodically transmitted to periodically reserve the one or more resources for the internal sidelink transmission.

With respect to process 800, in a seventh aspect, alone or in combination with one or more of the first through sixth aspects, process 800 includes transmitting the internal sidelink transmission using a transmit power that is lower than the transmit power associated with the assisting reservation message.

With respect to process 800, in an eighth aspect, alone or in combination with one or more of the first through sixth aspects, the assisting reservation message indicates an uncertainty associated with the lower RSRP to project onto the one or more resources reserved for the internal sidelink transmission based at least in part on an assisted UE in the disaggregated UE group transmitting the internal sidelink transmission.

With respect to process 800, in a ninth aspect, alone or in combination with one or more of the first through eighth aspects, the assisting reservation message indicates a maximum transmit power limit that external UEs are permitted to use to transmit using the one or more resources reserved for the internal sidelink transmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
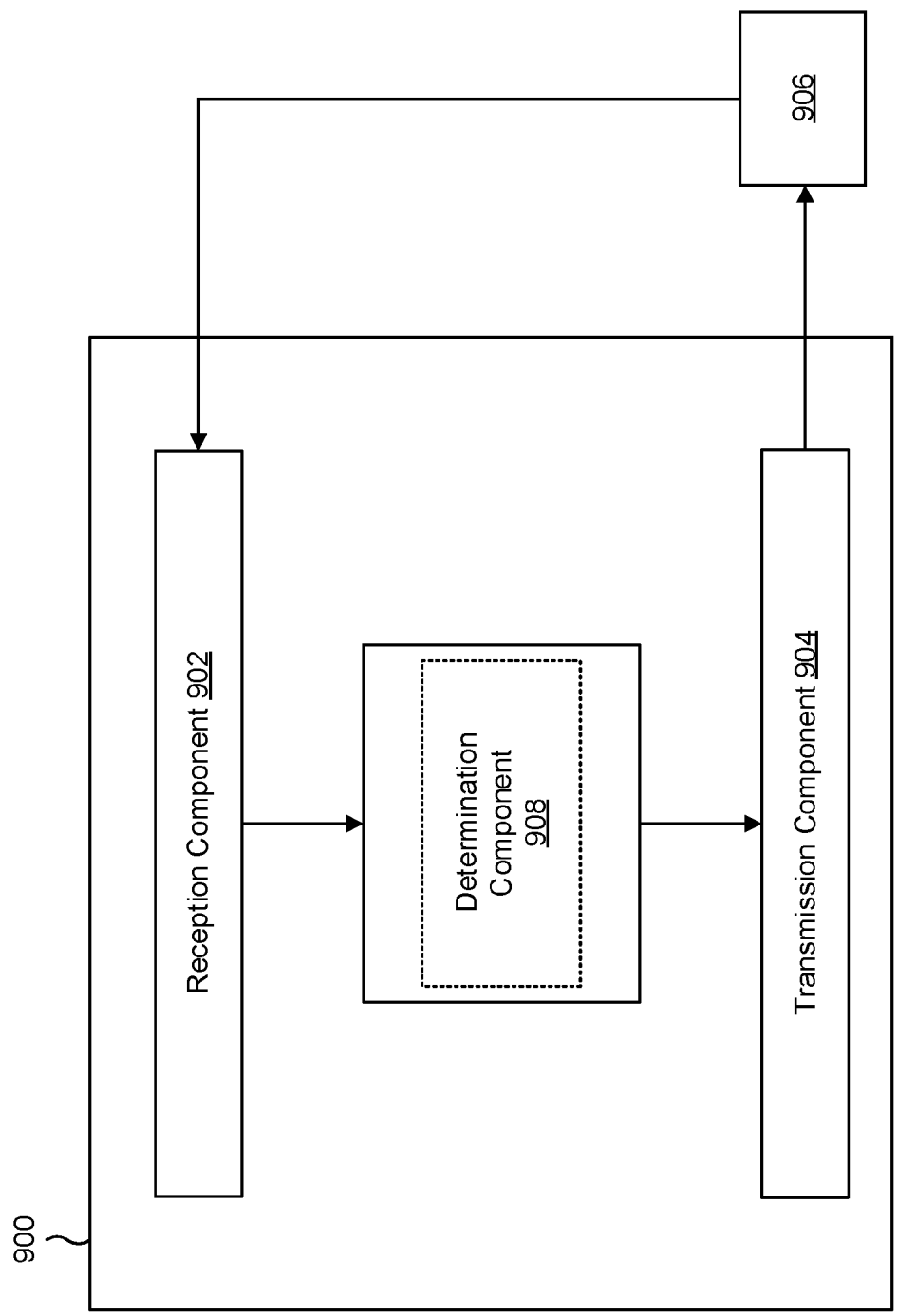
FIG. 9 is a block diagram of an example apparatus for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIGS. 7A-7C. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The determination component 908 may determine, within a resource selection window, one or more resources to reserve in a shared resource pool for an internal sidelink transmission within a disaggregated UE group including the assisting UE and one or more assisted UEs. The transmission component 904 may transmit, over a sidelink, an assisting reservation message indicating a lower RSRP to project onto the one or more resources reserved for the internal sidelink transmission relative to a measured RSRP that is based at least in part on a transmit power associated with the assisting reservation message.

The transmission component 904 may transmit the internal sidelink transmission using a transmit power that is lower than the transmit power associated with the assisting reservation message.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise forms disclosed. Modifications and variations may be made in light of the above disclosure or may be acquired from practice of the aspects.

Implementation examples are described in the following numbered aspects:

Aspect 1: A method of wireless communication performed by an assisting UE, comprising: determining, within a resource selection window, one or more resources to reserve in a shared resource pool for an internal sidelink transmission within a disaggregated UE group including the assisting UE and one or more assisted UEs; and transmitting, over a sidelink, an assisting reservation message indicating a lower RSRP to project onto the one or more resources reserved for the internal sidelink transmission relative to a measured RSRP that is based at least in part on a transmit power associated with the assisting reservation message.

Aspect 2: The method of Aspect 1, wherein the transmit power associated with the assisting reservation message is higher than a maximum transmit power for the internal sidelink transmission within the disaggregated UE group.

Aspect 3: The method of any of Aspects 1-2, wherein the lower RSRP to project onto the one or more resources reserved for the internal sidelink transmission is indicated according to a power offset over the assisting reservation message.

Aspect 4: The method of any of Aspects 1-2, wherein the lower RSRP to project onto the one or more resources reserved for the internal sidelink transmission is indicated according to a maximum transmit power for the internal sidelink transmission.

Aspect 5: The method of Aspect 4, wherein the assisting reservation message indicates the maximum transmit power for the internal sidelink transmission among multiple maximum transmit power levels associated with the shared resource pool.

Aspect 6: The method of any of Aspects 1-5, wherein the assisting reservation message is transmitted in a sensing window prior to the resource selection window to reserve the one or more resources for the internal sidelink transmission within the resource selection window.

Aspect 7: The method of any of Aspects 1-6, wherein the assisting reservation message is periodically transmitted to periodically reserve the one or more resources for the internal sidelink transmission.

Aspect 8: The method of any of Aspects 1-7, further comprising: transmitting the internal sidelink transmission using a transmit power that is lower than the transmit power associated with the assisting reservation message.

Aspect 9: The method of any of Aspects 1-7, wherein the assisting reservation message indicates an uncertainty associated with the lower RSRP to project onto the one or more resources reserved for the internal sidelink transmission based at least in part on an assisted UE in the disaggregated UE group transmitting the internal sidelink transmission.

Aspect 10: The method of any of Aspects 1-9, wherein the assisting reservation message indicates a maximum transmit power limit that external UEs are permitted to use to transmit using the one or more resources reserved for the internal sidelink transmission.

Aspect 11: An apparatus for wireless communications at a UE, comprising a processor; memory coupled to the processor; and instructions stored in the memory and executable by the processor to cause the apparatus to perform a method of any of Aspects 1 through 10.

Aspect 12: A non-transitory computer-readable medium storing one or more instructions for wireless communication at a UE, the one or more instructions executable by a processor to perform a method of any of Aspects 1 through 10.

Aspect 13: An apparatus for wireless communication at a UE, comprising at least one means for performing a method of any of Aspects 1 through 10.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at an assisting user equipment (UE), comprising:
a memory; and
one or more processors coupled to the memory, the memory and the one or more processors configured to:
determine, within a resource selection window, one or more resources to reserve in a shared resource pool for an internal sidelink transmission within a disaggregated UE group including the assisting UE and one or more assisted UEs; and
transmit, over a sidelink, an assisting reservation message indicating a lower reference signal received power (RSRP) to project onto the one or more resources reserved for the internal sidelink transmission relative to a measured RSRP that is based at least in part on a transmit power associated with the assisting reservation message.

2. The apparatus of claim 1, wherein the transmit power associated with the assisting reservation message is higher than a maximum transmit power for the internal sidelink transmission within the disaggregated UE group.

3. The apparatus of claim 1, wherein the lower RSRP to project onto the one or more resources reserved for the internal sidelink transmission is indicated according to a power offset over the assisting reservation message.

4. The apparatus of claim 1, wherein the lower RSRP to project onto the one or more resources reserved for the internal sidelink transmission is indicated according to a maximum transmit power for the internal sidelink transmission.

5. The apparatus of claim 4, wherein the assisting reservation message indicates the maximum transmit power for the internal sidelink transmission among multiple maximum transmit power levels associated with the shared resource pool.

6. The apparatus of claim 1, wherein the assisting reservation message is transmitted in a sensing window prior to the resource selection window to reserve the one or more resources for the internal sidelink transmission within the resource selection window.

7. The apparatus of claim 1, wherein the assisting reservation message is periodically transmitted to periodically reserve the one or more resources for the internal sidelink transmission.

8. The apparatus of claim 1, wherein the memory and the one or more processors are further configured to:
transmit the internal sidelink transmission using a transmit power that is lower than the transmit power associated with the assisting reservation message.

9. The apparatus of claim 1, wherein the assisting reservation message indicates an uncertainty associated with the lower RSRP to project onto the one or more resources reserved for the internal sidelink transmission based at least in part on an assisted UE in the disaggregated UE group transmitting the internal sidelink transmission.

10. The apparatus of claim 1, wherein the assisting reservation message indicates a maximum transmit power limit that external UEs are permitted to use to transmit using the one or more resources reserved for the internal sidelink transmission.

11. A method of wireless communication performed by an assisting user equipment (UE), comprising:
determining, within a resource selection window, one or more resources to reserve in a shared resource pool for an internal sidelink transmission within a disaggregated UE group including the assisting UE and one or more assisted UEs; and
transmitting, over a sidelink, an assisting reservation message indicating a lower reference signal received power (RSRP) to project onto the one or more resources reserved for the internal sidelink transmission relative to a measured RSRP that is based at least in part on a transmit power associated with the assisting reservation message.

12. The method of claim 11, wherein the transmit power associated with the assisting reservation message is higher than a maximum transmit power for the internal sidelink transmission within the disaggregated UE group.

13. The method of claim 11, wherein the lower RSRP to project onto the one or more resources reserved for the internal sidelink transmission is indicated according to a power offset over the assisting reservation message.

14. The method of claim 11, wherein the lower RSRP to project onto the one or more resources reserved for the internal sidelink transmission is indicated according to a maximum transmit power for the internal sidelink transmission.

15. The method of claim 14, wherein the assisting reservation message indicates the maximum transmit power for the internal sidelink transmission among multiple maximum transmit power levels associated with the shared resource pool.

16. The method of claim 11, wherein the assisting reservation message is transmitted in a sensing window prior to the resource selection window to reserve the one or more resources for the internal sidelink transmission within the resource selection window.

17. The method of claim 11, wherein the assisting reservation message is periodically transmitted to periodically reserve the one or more resources for the internal sidelink transmission.

18. The method of claim 11, further comprising:
transmitting the internal sidelink transmission using a transmit power that is lower than the transmit power associated with the assisting reservation message.

19. The method of claim 11, wherein the assisting reservation message indicates an uncertainty associated with the lower RSRP to project onto the one or more resources reserved for the internal sidelink transmission based at least in part on an assisted UE in the disaggregated UE group transmitting the internal sidelink transmission.

20. The method of claim 11, wherein the assisting reservation message indicates a maximum transmit power limit that external UEs are permitted to use to transmit using the one or more resources reserved for the internal sidelink transmission.

21. An apparatus for wireless communication, comprising:
means for determining, within a resource selection window, one or more resources to reserve in a shared resource pool for an internal sidelink transmission within a disaggregated user equipment (UE) group including the apparatus and one or more assisted UEs; and
means for transmitting, over a sidelink, an assisting reservation message indicating a lower reference signal received power (RSRP) to project onto the one or more resources reserved for the internal sidelink transmission relative to a measured RSRP that is based at least in part on a transmit power associated with the assisting reservation message.

22. The apparatus of claim 21, wherein the lower RSRP to project onto the one or more resources reserved for the internal sidelink transmission is indicated according to a power offset over the assisting reservation message.

23. The apparatus of claim 21, wherein the lower RSRP to project onto the one or more resources reserved for the internal sidelink transmission is indicated according to a maximum transmit power for the internal sidelink transmission.

24. The apparatus of claim 21, further comprising:
means for transmitting the internal sidelink transmission using a transmit power that is lower than the transmit power associated with the assisting reservation message.

25. The apparatus of claim 21, wherein the assisting reservation message indicates an uncertainty associated with the lower RSRP to project onto the one or more resources reserved for the internal sidelink transmission based at least in part on an assisted UE in the disaggregated UE group transmitting the internal sidelink transmission.

26. A non-transitory computer-readable medium storing a set of instructions for wireless communication, the set of instructions comprising:
one or more instructions that, when executed by one or more processors of an assisting user equipment (UE), cause the UE to:
determine, within a resource selection window, one or more resources to reserve in a shared resource pool for an internal sidelink transmission within a disaggregated UE group including the assisting UE and one or more assisted UEs; and
transmit, over a sidelink, an assisting reservation message indicating a lower reference signal received power (RSRP) to project onto the one or more resources reserved for the internal sidelink transmission relative to a measured RSRP that is based at least in part on a transmit power associated with the assisting reservation message.

27. The non-transitory computer-readable medium of claim 26, wherein the lower RSRP to project onto the one or more resources reserved for the internal sidelink transmission is indicated according to a power offset over the assisting reservation message.

28. The non-transitory computer-readable medium of claim 26, wherein the lower RSRP to project onto the one or more resources reserved for the internal sidelink transmission is indicated according to a maximum transmit power for the internal sidelink transmission.

29. The non-transitory computer-readable medium of claim 26, wherein the one or more instructions further cause the UE to:
   transmit the internal sidelink transmission using a transmit power that is lower than the transmit power associated with the assisting reservation message.

30. The non-transitory computer-readable medium of claim 26, wherein the assisting reservation message indicates an uncertainty associated with the lower RSRP to project onto the one or more resources reserved for the internal sidelink transmission based at least in part on an assisted UE in the disaggregated UE group transmitting the internal sidelink transmission.

* * * * *